United States Patent [19]

Huntjens et al.

[11] Patent Number: 4,483,970

[45] Date of Patent: Nov. 20, 1984

[54] POLYESTER-ESTER URETHANE

[75] Inventors: Franciscus J. Huntjens, Arnhem; Anton H. J. Brouwer, Oosterbeek, both of Netherlands

[73] Assignee: Akzo N.V., Arnhem, Netherlands

[21] Appl. No.: 523,955

[22] Filed: Aug. 17, 1983

[30] Foreign Application Priority Data

Aug. 17, 1982 [NL] Netherlands ............... 8203220

[51] Int. Cl.³ ................................. C08G 18/42
[52] U.S. Cl. ............................ 525/440; 528/83; 528/84
[58] Field of Search ............... 525/440; 528/83, 84

[56] References Cited

U.S. PATENT DOCUMENTS 4,186,257 1/1980 Blahak et al. ............... 521/159

FOREIGN PATENT DOCUMENTS 13461 7/1980 European Pat. Off.
2380308 9/1978 France.

Primary Examiner—Maurice J. Welsh
Attorney, Agent, or Firm—Stevens, Davis, Miller & Mosher

[57] ABSTRACT

The invention relates to novel high molecular weight polyester-ester urethanes containing blocks of ester units of a high melting polyester and of blocks of ester units of a low melting polyester which are linked together through ester groups and/or urethane groups. The melting point of the polyester-ester urethanes is at least 150° C. and when the blocks of ester units of the low melting polyester form part of less than 50% by weight of the total number of ester units the upper limit of the glass transition range $Tg_{(e)}$ thereof does not exceed +20° C. and when said blocks of ester units of the low melting polyester form part of more than 50% by weight of the total number of ester units, the upper limit of the glass transition range $Tg_{(e)}$ is not higher than −5° C. The polyester-ester urethanes are prepared by reacting a high melting polyester and a low melting polyester in the molten phase, after which the resulting polyester-ester is reacted with a low molecular weight polyisocyanate.

When the number of end groups of the high melting polyester and the low-melting polyester together amount to more than 700 meq per kg, the transesterification catalyst present in one or in both polyesters or polyester amides is entirely or partly deactivated before and/or during the preparation of the polyester-ester.

17 Claims, No Drawings

POLYESTER-ESTER URETHANE

The invention relates to a polyester-ester urethane built up of polyester-ester units which are linked together by low molecular weight structural units of the formula

wherein $R_1$ represents a polyfunctional organic group having not more than 30 carbon atoms, and p is an integer of 2 or 3, which polyester-ester units are built up of blocks comprising a multiple of ester units of the formula

and blocks comprising a multiple of ester units which may form a bifunctional polyester or polyester amide having a melting point not higher than 100° C., which two types of polyester units are linked together by ester bonds, with the proviso that: at least 80 mole % of the G groups in the latter formula are tetramethylene radicals and the remaining proportion thereof are divalent radicals left after removal of hydroxyl groups from a low molecular weight diol having a molecular weight not higher than 250; at least 80 mole % of the $R_2$ groups are 1,4-phenylene radicals and the remaining proportion thereof are divalent radicals left after removal of carboxyl groups from a low molecular weight dicarboxylic acid having a molecular weight not higher than 300; the sum of the percentages of G groups which are not tetramethylene radicals and of the percentage of $R_2$ groups which are not 1,4-phenylene radicals does not exceed 20; and the ester units of the formula

form 20 to 90% by weight of the polyester-ester. The invention also relates to the processes for the preparation of such polyester-ester urethane.

The preparation of polyester-ester urethanes of the type indicated above is described in U.S. Pat. No. 4 186 257. According to the known process a low molecular weight polyisocyanate is reacted with a block copolymer containing isocyanate-reactive hydrogen atoms. As block copolymers there may be used, for instance, copolyether esters and copolyester esters.

The preparation of copolyether esters is described in, among other publications, U.S. Pat. Nos. 3 023 192 and 3 849 515.

According to the examples mentioned in the aforementioned U.S. Pat. No. 4 186 257 the preparation of polyester-esters is attended with a high degree of transesterification, which results in finally obtaining a polyurethane having a greatly reduced melting point and a very much increased upper limit of the glass transition range [$Tg_{(e)}$] of the low-melting polyester segment.

The present invention provides a polyester-ester urethane having greatly improved properties.

The invention consists in that in a polyester-ester urethane of the type indicated above as known the interlinked ester units of the formula

and the other ester units interlinked to form a bifunctional polyester or polyester amide are present in an amount such that the melting point of the polyester-ester urethane is at least 150° C. and when the blocks of ester units of the low melting polyester form part of less than 50% by weight of the total number of ester units, the upper limit of the glass transition range [$Tg_{(e)}$] thereof does not exceed +20° C. and when said blocks of ester units of the low melting polyester form part of more than 50% by weight of the total number of ester units, the upper limit of the glass transition range $Tg_{(e)}$ is not higher than −5° C.

It has been found that a polyester-ester urethane having satisfactory properties is generally obtained when the proportion of low-molecular weight structural units of the formula

calculated as diphenylmethane-4,4'-diisocyanate (MDI) and based on the polyester-ester urethane is in the range of 0,5 to 25% by weight.

Preference is given to a polyester-ester urethane in which the proportion of the low molecular weight structural units is in the range of 1 to 15% by weight.

At least 80 mole % of the low molecular weight diol and at least 80 mole % of the low molecular weight dicarboxylic acid from which the ester units of the formula

are derived is formed respectively of 1,4-butanediol and terephthalic acid.

Included among suitable diols (other than 1,4-butanediol) having a molecular weight not exceeding 250 are acyclic, alicyclic and aromatic dihydroxy compounds.

Preferred are diols with 2-15, and particularly 5-10 carbon atoms such as ethylene, propylene, isobutylene, pentamethylene, 2,2-dimethyltrimethylene, hexamethylene, and decamethylene glycol, dihydroxy cyclohexane, dimethanol cyclohexane, resorcinol, hydroquinone and 1,5-dihydroxy naphthalene.

Especially preferred are aliphatic diols containing 2-8 carbon atoms. Included among the bis-phenols which can be used are bis(p-hydroxy)diphenyl, bis(p-hydroxyphenyl)methane and bis(p-hydroxyphenyl)propane. Suitable dicarboxylic acids (other than terephthalic acid) having a molecular weight not exceeding 300 are aliphatic, cycloaliphatic or aromatic dicarboxylic acids.

The term aliphatic dicarboxylic acids as used in the description of the invention refers to carboxylic acids having two carboxyl groups which are each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids as maleic acid, can be used.

Aromatic dicarboxylic acids, as the term is used herein, are dicarboxylic acids having two carboxyl groups attached to carbon atoms in an isolated or fused benzene ring. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allyl-malonic acid, 4-cyclohexane-1,2-dicarboxylic acid, 2-ethylsuberic acid, $\alpha,\alpha'$-$\beta.\beta'$-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene-bis-(cyclohexane carboxylic acid), 3,4-furan dicarboxylic acid and 1,1-cyclobutane dicarboxylic acid. Preferred aliphatic and cycloaliphatic acids are cyclohexane-dicarboxylic acids and adipic acid. Representative aromatic dicarboxylic acids which can be used include phthalic and isophthalic acids, bibenzoic acids, substituted dicarboxy compounds with two benzene nuclei such as bis(p-carboxyphenyl)methane, p-oxy(p-carboxyphenyl)benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and C$_1$-C$_{12}$ alkyl and/or ring substitution derivatives thereof, such as halo, alkoxy and aryl derivatives. Hydroxyl acids such as p($\beta$-hydroxyethoxy)benzoic acid can also be used, providing an aromatic dicarboxylic acid is also present.

Aromatic dicarboxylic acids are a preferred class for preparing the ester units of the formula:

Among the aromatic acids, those with 8–16 carbon atoms are preferred, particularly the phenylene dicarboxylic acids, i.e., phthalic and isophthalic acids.

In view of the melting point and the relatively high crystallization or curing rate of the polyester-ester urethane it is preferred that the ester units of the formula

should be butylene terephthalate units. The procedure for preparing the low melting polyesters or polyester amides is known per se and similar to that used for preparing high melting polyesters. It may be realized for instance by polycondensation of polyfunctional, preferably bifunctional alcohols, amino alcohols, hydroxycarboxylic acids, lactones, aminocarboxylic acids, cyclic carbonates or polycarboxylic acids. By a proper choice of the mixing ratio of the above-mentioned components any desirable molecular weight and number and type of terminal groups may be obtained.

As examples may be mentioned polyesters from adipic acid and ethylene glycol, butanediol, pentanediol, hexanediol, mixtures of ethylene glycol and propylene glycol, hexanediol and methylhexanediol, hexanediol and 2,2-dimethyl-1,3-propanediol, hexanediol, butanediol or pentanediol or polyester amides from hexanediol and piperazine. Also other glycols, such as 1,3- or 1,4-cyclohexanediol or 1,3- or 1,4-bis(hydroxymethyl)-cyclohexane, amino alcohols such as amino ethanol or amino propanol may be incorporated into the low melting components.

The low melting components also may entirely or partly be composed of lactones such as substituted or unsubstituted caprolactone or butyrolactone.

Under some circumstances, for instance to increase the melt viscosity of the endproduct, it may be recommended to incorporate some small amount of higher functional compounds.

As examples of such compounds may be mentioned trimethylol ethane, trimethylol propane or hexane triol. The low melting bifunctional components may also be derived from the following acids: glutaric acid, pimelic acid, suberic acid, isosebacic acid or ricinoleic acid. Also aliphatic dicarboxylic acids having hetero atoms, such as thiodipropionic acid may be used in the low melting bifunctional compounds. In addition there still may be mentioned cycloaliphatic dicarboxylic acids such as 1,3- or 1,4-cyclohexane dicarboxylic acid and terephthalic acid and isophthalic acid.

For an essentially better resistance to hydrolysis preference is given to polyesters of which the constituents each consist of at least 5 carbon atoms.

As examples may be mentioned adipic acid and 2,2-dimethyl propanediol or mixtures of 1,6-hexanediol and 2,2-dimethyl propanediol or 2-methyl-1,6-hexanediol. In addition to the low melting polyesters or polyester amides some other low melting bifunctional compounds may to a limited extent be incorporated into the segmented thermoplastic elastomers according to the invention. As examples may be mentioned polyalkylene glycol ethers having terminal hydroxyl groups as obtained by reaction with water, diamines, di- or trifunctional alcohols or amino alcohols. Special mention is made here of polytetrahydrofuran obtained by polymerization of tetrahydrofuran in the presence of acid catalysts or copolymers thereof with small amounts of ethylene oxide and/or propylene oxide.

The essential advantages of the present invention, such as a very good resistance to UV light will be manifest only upon exclusive use of polyesters and/or polyester amides, which are therefore preferred. A limited percentage of, for instance, polyethylene oxide glycol may be of use for improving physical properties, such as swelling in oil.

Both in view of its being readily obtainable and of other properties of the final elastomer preference is given to a polyester-ester urethane whose ester units that may form a bifunctional polyester or polyester amide having a melting point not higher than 100° C. are entirely or substantially derived from polybutylene adipate.

A polyester-ester urethane having very good properties is also obtained when the ester units that may form a bifunctional polyester or polyester amide having a melting point not higher than 100° C. are entirely or substantially derived from polycaprolactone. The low molecular weight structural units of the formula

which may be used according to the invention are derived from di- and triisocyanates. The diisocyanates may be represented by the general formula OCNR-NCO, wherein R represents a divalent, aliphatic, alicyclic or aromatic group.

Examples of suitable diisocyanates of the aliphatic type are: hexamethylene diisocyanate, dimethyl hexamethylene diisocyanate, trimethyl hexamethylene diisocyanate, metaxylylene diisocyanate, paraxylylene diisocyanate, tetramethylene diisocyanate.

When R represents an aromatic group, it may be substituted for instance with a halogen, a lower alkyl or a lower alkoxy group.

Examples of these diisocyanates include: 1-chloro-2,4-phenylene diisocyanate, 2,4-toluene diisocyanate, a mixture of 2,4-toluene and 1,6-toluene diisocyanate, tetramethylphenylene diisocyanate, diphenylmethane-4,4'-diisocyanate, metaphenylene diisocyanate, paraphenylene diisocyanate, naphthalene-1,5-diisocyanate, diphenyl-4,4'-diisocyanate, biphenylmethane-4,4'-diisocyanate, biphenyldimethylmethane-4,4'-diisocyanate, benzophenone-4,4'-diisocyanate, biphenylether diisocyanate and biphenylsulphide diisocyanate, 3,3'-dimethyldiphenyl-4,4'-diisocyanate, 3,3'-dimethoxydiphenyl-4,4'-diisocyanate, 3,3'-dichlorodiphenyl-4,4'-diisocyanate, 3,3'-dichlorodiphenyl-4,4'-diisocyanate, benzofuran-2,7-diisocyanate.

Examples of diisocyanates having an alicyclic group include isophoron diisocyanate, dicyclohexylmethane diisocyanate and 1,4-cyclohexane diisocyanate.

It has been found that optimum properties are generally obtained if the ratio of the number of —NCO groups of the diisocyanate to the number of functional groups of the block polyester-esters is in the range of 1,1 to 1,5.

Both with a view to the properties of the end product and simplicity of preparation preference is given according to the invention to polyester-esters having hydroxyl end groups.

The invention also relates to processes for the preparation of a polyester-ester urethane of the known type indicated in the opening paragraph, with the number of interlinked ester units of the formula

and the number of other ester units interlinked to form a bifunctional polyester or polyester amide are such that the melting point of the polyester-ester urethane is at least 150° C. and the upper limit of the glass transition range (Tg$_{(e)}$) of the low melting polyester segment in the case of 50% by weight or more of ester units of the formula

does not exceed +20° C. and in the case of less than 50% by weight of ester units of the formula

is not higher than −5° C.

One of these processes of the type known from the previously mentioned U.S. Pat. No. 4 186 257, a bifunctional polyester having a molecular weight of at least 1000 and built up of ester units of the formula

wherein both G and R$_2$ have the same meaning as indicated before, is reacted, while in the molten phase, with a bifunctional polyester or polyester amide having a molecular weight of at least 1000 and a melting point not higher than 100° C., after which the resulting polyester-ester is reacted with a low molecular weight coupling agent of the formula

wherein R$_1$ and p have the afore-indicated meaning, in an amount, such that the ratio of the number of —NCO groups to the number of functional groups of the polyester-ester is at least 1,0 and not higher than 5, is characterized in that before and/or during the preparation of the polyester-ester the transesterification catalyst present in one or in both polyesters or polyesteramides is entirely or partly deactivated.

When use is made of a mixture of polyesters or polyester amides having a hydroxyl number of 40 or higher the transesterification catalyst will have to be deactivated almost entirely in order to obtain a polyester-ester urethane according to the invention.

On the other hand, if the preparation is started from a mixture of polyesters or polyester amides having a lower hydroxyl number, particularly if use is made of starting products having a relatively high molecular weight, then partial deactivation will within a particular space of time lead to optimally transesterified block polyester-ester. At a given weight ratio of polyesters having a particular molecular weight (hydroxyl number) it will not be difficult for a man skilled in the art to choose the most favourable conditions which lead to a copolyester-ester urethane having optimum properties.

The present process is advantageously started from a low-melting bifunctional polyester or polyester amide having a molecular weight of 1500 to 2500 and a high-melting polyester of the formula

having a molecular weight in the range of 10 000 to 25 000. Preference is given then to the use of a high-melting polyester which entirely or substantially consists of polybutylene terephthalate having a molecular weight in the range of 15 000 to 19 000.

When, however, use is made of a high-melting polyester having a molecular weight in the range of 1500 to 3000, preference is given to its use in combination with a low-melting polyester or polyester amide having a molecular weight in the range of 10 000 to 20 000.

For the purpose of transesterification in the preparation of the polyester use is generally made of a titanium catalyst or a calcium salt, a manganese salt and/or a zinc salt. These salts may be deactivated by adding precipitating or complexing agents. Deactivation also may be carried out by applying a thermal treatment. It has been found, for instance, that when the catalyst used is zinc acetate, it may be deactivated by heating to a temperature of at least 200° C. Favourable results are particularly found to be obtained when use is made of complexing phosphorus compounds, which are also suitable to be used as stabilizers in polyesters.

In this connection reference is made to the phosphites and thiophosphites which are described in U.S. Pat. No. 3 039 993, and to the phosphates, phosphonates, phosphonic acids and phosphinic acids of the following structural formulae:

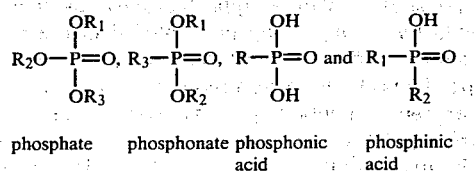

phosphate  phosphonate  phosphonic acid  phosphinic acid wherein R, $R_1$, $R_2$ and $R_3$ may be the same or different and represent a hydrogen atom or a substituted or unsubstituted organic group. Examples of suitable substituents are a lower alkyl group, cycloalkyl group, alkoxy group, cycloalkoxy group, hydroxyl group and/or a halogen atom. If R, $R_1$, $R_2$ and $R_3$ represent an organic group they generally do not contain more than 30, and preferably not more than 18 carbon atoms. As examples may be mentioned alkyl, cycloalkyl, carboalkoxy alkyl, aryl, aralkyl and aroxy alkyl.

As examples of phosphorus compounds that are excellently suitable to be used for the present purpose may be mentioned: triphenyl phosphate, triphenyl phosphite, triethyl phosphite, tricyclohexyl phosphite, tri-2-ethylhexyl trithiophosphite, trieicosyl phosphite, tri-o-chlorophenyl phosphite, 2-carbomethoxyethyl dimethyl phosphonate, hydroxymethyl phosphonic acid, diphenyl phosphinic acid, carboxymethyl phosphonic acid, carbethoxymethyl phosphonic acid, carboxyethyl phosphonic acid, tris(triethylene glycol)phosphate and more particularly carbethoxymethyl diethyl phosphonate and tri-p-tert. butylphenyl phosphite.

Favourable results are also obtained by using phosphorus compounds of the formula:

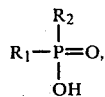

wherein $R_1$ and $R_2$ may be the same or different and represent a hydrogen atom or an alkyl, cycloalkyl, aralkyl or aryl group each having not more than 20 carbon atoms, or the group $OR_3$, wherein $R_3$ represents a metal or ammonium or the same group or the same atom as $R_1$, irrespective of the meaning of $R_1$.

Examples of suitable phosphorus compounds include the inorganic acids such as orthophosphoric acid, phosphorous acid or hypophosphorous acid; phosphinic acid such as methyl phosphinic acid, ethyl phosphinic acid, isobutyl phosphinic acid, benzyl phosphinic acid, phenyl phosphinic acid, cyclohexyl phosphinic acid or 4-methylphenyl phosphinic acid; phosphonic acids such as methyl phosphonic acid, ethyl phosphonic acid, isopropyl phosphonic acid, isobutyl phosphonic acid, benzyl phosphonic acid, phenyl phosphonic acid, cyclohexyl phosphonic acid, or 4-methylphenyl phosphonic acid; the partial esters of said acids, more particularly the $C_{1-20}$ alkyl, cycloalkyl, aryl or aralkyl esters, such as the methyl, ethyl, propyl, cyclohexyl, phenyl or benzyl esters; the partial metal salts of these acids, of which particularly the metals of the groups I and II of the periodic system, such as sodium, potassium, calcium or magnesium; and the partial ammonium salts of these acids.

When use has been made of a salt of calcium, manganese and/or zinc as transesterification catalyst, care should be taken that no antimony oxide is used as polycondensation catalyst. For in that case the salts can hardly, if at all, be deactivated before and/or during the transesterification reaction.

It is generally desirable that the phosphorus compound used for deactivation corresponds to at least 0,5 phosphorus atoms per metal atom of the transesterification catalyst.

Favourable results are as a rule obtained when the amount of phosphorus compounds used for deactivation corresponds to 1 to 15 phosphorus atoms per metal atom, preference being given to using 1 to 5 phosphorus atoms per metal atom.

According to the present invention it is preferred that use should be made of polyesters and/or polyester amides prepared in the presence of a catalytic amount of a titanium catalyst. The advantage of a titanium catalyst is not only its high reactivity, but especially the ease with which it can be deactivated.

Examples of suitable titanium catalysts include esters of titanium acid and the neutralized products thereof, hydrogenated hexa-alkoxy titanates of magnesium, titanyl oxalates, titanium halides, hydrolysed products of titanium halides, titanium hydroxide and titanium oxide hydrate and potassium titanium fluoride ($K_2TiF_6$). Preference is given to alkyl titanates such as tetramethyl titanate, tetraethyl titanate, tetrapropyl titanate or tetrabutyl titanate, the neutralized products thereof, the hydrogenated magnesium hexa-alkoxy titanates, such as hydrogenated magnesium hexabutoxy titanate Mg(HTi[OC$_4$H$_9$]$_6$)$_2$, titanyl oxalate, calcium titanyl oxalate, titanium tetrachloride, the reaction product of titanium tetrachloride and hexane diol and the reaction mixture of titanium tetrachloride and water. Said titanium catalysts are used alone or in combination with magnesium acetate or calcium acetate. Inorganic titanates such as lanthanum titanate, calcium acetate/antimony trioxide mixtures and lithium alkoxides and magnesium alkoxides are examples of other suitable catalysts. The amount in which they are to be incorporated generally ranges from 0,005 to 0,3% by weight, calculated on the components taking part in the reaction. For a man skilled in the art it will not be difficult to decide on the amount of catalyst to be used for a given system.

Many of the low-melting polyesters or polyester amides that may be used according to the invention are commercially available. Applicant has found that they contain no or hardly any transesterification promoting catalysts. There is therefore generally no need for these low-melting components to be deactivated. The high-melting components, however, are generally prepared in the presence of a transesterification promoting catalyst. When the deactivating compound is a phosphorus compound, the results obtained are generally satisfactory if the phosphorus compound is incorporated into the high-melting polyester prior to the reaction process and the mixture is kept in the molten state for at least 5 minutes. It has been found that satisfactory results are generally obtained when the high-melting polyester containing the phosphorus compound is in the molten phase for a period of 30 to 60 minutes. The polyesteresters to be used according to the invention are usually prepared at a temperature ranging between the melting point of the highest-melting component and 290° C. An alternative procedure for obtaining a polyester-ester urethane according to the invention may be by using a process known from the aforementioned U.S. Pat. No. 4,186,257 in which a bifunctional polyester having a molecular weight of at least 1000 and built up of ester units of the formula

wherein both G and $R_2$ have the same meaning as indicated before, is reacted, while in the molten phase, with a bifunctional polyester or polyester amide having a molecular weight of at least 1000 and a melting point not higher than 100° C., after which the resulting polesterester is reacted with a low molecular weight coupling agent of the formula

wherein $R_1$ and p have the afore-indicated meaning, in an amount such that the ratio of the number of —NCO groups to the number of functional groups of the polyester-ester is at least 1,0 and not higher than 5, characterized in that the number of end groups of the high-melting polyester and the low-melting polyester together do not amount to more than 700 meq per kg.

Surprisingly, it has been found that under the above-mentioned process conditions when use is made of a mixture of a high-melting polyester and a low-melting polyester or polyester amide having a total number of end groups not exceeding 700 meq per kg, there is no longer any need for deactivation. The advantage of the last-mentioned process especially consists in that the amount of polyisocyanate to be used may be reduced to a minimum.

Thus, when use is made of a polyester mixture having 70 meq end groups per kg the amount of diisocyanate calculated as MDI need only be as high as 1% by weight in the case of an NCO/OH ratio of 1,1.

The length of time the high-melting and the low-melting polyester or polyester amide must react with each other to give an optimally transesterified block polyester-ester depends, in part, on the number of meq end groups per kg, the amount of transesterification catalyst and the composition of the polyesters used.

It has been found that the last-mentioned process always leads to favourable results if the number of end groups both of the high-melting polyester and of the low-melting polyester or polyester amide is in the range of 110 to 170 meq per kg in either case.

It has been found that under some circumstances the resistance to hydrolysis of the elastomers prepared by the present process is not satisfactory. According to the invention this situation may be met by the incorporation preferably into the ready product of some stabilizing amount of polycarbodiimide. The amount to be incorporated is entirely in accordance with the provision described in Netherlands Patent Application No. 6 907 958 for the stabilization of polyethyleneterephthalate.

Another suitable solution to improving the resistance to hydrolysis is the incorporation of 0,5 to 5 percent by weight, calculated on the elastomer of high molecular weight silicone compounds having —OH, —$NH_2$ and-/or —COOH end groups.

The thermoplastic elastomers obtained by the processes of the present invention are excellently suitable to be injection moulded or extruded. They have the great advantage of an extraordinarily high resistance to oxidative degradation and UV radiation. The hardness of the polyester-ester urethanes according to the invention may be varied by changing the percentage of high-melting polyester in the copolyester ester. A polymer composition having a higher hardness also may be obtained by mixing a starting material in the form of a relatively soft polyester-ester urethane with a harder type of a polyester-ester urethane, a harder copolyether ester mainly containing polybutylene terephthalate as hard segment, or polybutylene terephthalate or a copolyester mainly containing polybutylene terephthalate.

The invention will be further described in the following examples. They are, however, not to be construed as being limiting in any manner whatsoever.

For the determination of the properties of the polymers prepared as described in these examples use was made of the following methods:

A Du Pont Thermal Analyzer was employed for determining:

Tg=the temperature range within which the glass transition of the soft segment takes place;

$Tg_{(e)}$=the upper limit of the glass transition range (Tg) of the low-melting polyester segment, which is taken as the intersection between the extrapolated sloping portion and the baseline of the DSC-figure.

Tm=the temperature range within which the hard segment melts;

$Tm_p$=temperature at melting peak(s).

The measured temperatures are expressed in °C.

The stress-strain curves were measured on extruded bars 6 mm wide and 1 mm thick. The bars were formed in a mould at a temperature which was 15° C. above the melting point. The rate of specimen extension per minute was 500% based on the nominal gauge length. Thus, the following values were found:

—$S_{100}$=stress at 100% elongation (in MPa);
—$S_{300}$=stress at 300% elongation (in MPa);
—$S_{500}$=stress at 500% elongation (in MPa);
—$S_{300/100}$=ratio between stress at 300% elongation and 100% elongation;
—$S_{500/100}$=ratio between stress at 500% elongation and 100% elongation;
—BS=breaking strength (in MPa);
—BR=elongation at break (in %);

$$IS = \text{intrinsic strength} \left( = BS \times \frac{BR + 100}{100} \right) \text{ [in MPa]};$$

—$SR_{100-\frac{1}{2}}$=stress relaxation (=decrease of stress [%] after ½ hour's stress at 100% elongation);
—$V_{100-\frac{1}{2}}$=set (%) after ½ hour's stress at 100% elongation;
—$V_{100-\frac{1}{2}-\frac{1}{2}}$=set (%) after ½ hour's stress at 100% elongation and leaving the material for ½ hour in the stressless state.

EXAMPLE I

Use being made of the same procedure as given in Example 13 of U.S. Pat. No. 4 186 257, polybutylene terephthalate (PBTB) having a molecular weight of 1500 was prepared by transesterifying dimethyl terephthalate in the presence of an excess of 1,4-butanediol and 420 ppm of tetrabutyl titanate as catalyst.

The polybutylene terephthalate thus prepared and an equivalent amount by weight of polybutylene adipate (PBA) having a molecular weight of 1850 were mixed for 1 hour at 240° C. under nitrogen. The polyester mixture consequently contained 1207 meq of reactive end groups per kg. Subsequently, per 100 g of polyester-ester 16,7 g of diphenylmethane-4,4'-diisocyanate (MDI) were added, followed by continued stirring for 30 minutes at 230° C.

The experiment was repeated in such a way that according to the invention the polybutylene terephthalate to be coupled to polybutylene adipate was heated for 30 minutes to 245° C. in the presence of 1300 ppm of diethyl carbethoxy methyl phosphonate (PEE). On conclusion of the deactivation reaction the product obtained was mixed, in the afore-described manner, with polybutylene adipate to form a polyester-ester, after which again 16,7 g of MDI per 100 g of polyester-ester were added. On conclusion of the reaction samples of the two polymers were examined for their properties. The results are given in the table below, polymer A being the polymer prepared in accordance with U.S. Pat. No. 4 186 257 and polymer B in accordance with the present invention.

TABLE I

| Polymer weight ratio PBTP/PBA | A 50/50 | B 50/50 |
|---|---|---|
| Tg (°C.) | −18/1 | −37/−12 |
| Tm (°C.) | — | 153/217 |
| $Tm_p$ (°C.) | 108 | 195 |
| $S_{100}$ (MPa) | 2,3 | 11,0 |
| $S_{300}$ (MPa) | 13,5 | 19,4 |
| $S_{500}$ (MPa) | 29,0 | 29,3 |
| $S_{500/100}$ | 12,6 | 2,7 |
| BS (MPa) | 25 | 38,3 |
| BR % | 575 | 650 |
| IS (MPa) | 169 | 290 |
| $SR_{100\frac{1}{2}}$% | 54 | 39 |
| $V_{100\frac{1}{2}}$% | 83 | 42 |
| $V_{100\frac{1}{2}-\frac{1}{2}}$% | 75 | 27 |

From the above table it is clear that in the case of non-deactivation of the transesterification catalyst of the polybutylene terephthalate having a relatively low molecular weight there will be a relatively high degree of transesterification, which results in obtaining a polymer which in addition to having a far too low melting point is deficient as regards several other properties of a product of this composition. Thus, the values given for $V_{100-\frac{1}{2}}$, $V_{100-\frac{1}{2}-\frac{1}{2}}$ and $SR_{100-\frac{1}{2}}$ are indicative of poor elastomeric properties of polymer A.

EXAMPLE II

The starting material in this example was again a polybutylene adipate having a molecular weight of 1850. The polybutylene terephthalate was prepared in the same manner as indicated in Example I, with the exception that the catalyst used consisted of 1700 ppm of tetrabutyl titanate and the polycondensation reaction was continued until a molecular weight of 16 000 was obtained. The polybutylene terephthalate (PBTP) was subsequently heated for 30 minutes at 245° C. in the presence of 2500 ppm of diethyl carboxymethyl phosphonate. This corresponds to a P/Ti ratio of 2,4. Next, an equivalent amount by weight of polybutylene adipate (PBA) was added to the molten polymer. After the reaction mixture had turned clear, there were added 8,5 parts of MDI per 100 parts of polyester, after which stirring was continued for 30 minutes at 230° C. The results of measuring the various polymer properties are given in the table below.

TABLE II

| Polymer weight ratio PBTP/PBA | 50/50 |
|---|---|
| Tg (°C.) | −50/−27 |
| Tm (°C.) | 145/225 |
| $Tm_p$ (°C.) | 204 |
| $S_{100}$ (MPa) | 12,7 |
| $S_{300}$ (MPa) | 18,0 |
| $S_{500}$ (MPa) | 28,7 |
| BS (MPa) | 51,7 |
| BR % | 700 |
| IS (MPa) | 410 |
| $SR_{100\frac{1}{2}}$% | 31 |
| $V_{100\frac{1}{2}}$% | 34 |
| $V_{100\frac{1}{2}-\frac{1}{2}}$% | 23 |

EXAMPLE III

The PBA and the PBTP used here had the same molecular weight as in Example II. The weight ratio of PBA to PBTP was 63/37. The PBTP was prepared using 420 ppm of tetrabutyl titanate as catalyst.

Five batches were prepared using different amounts of diethyl carbethoxy methyl phosphonate (PEE) for deactivation of the transesterification catalyst present in the PBTP. The method adopted was the same for each batch. After PEE had been added to the PBTP, the resulting mixture was heated for 30 minutes to 240° C. Subsequently, PBA was added, after which the mixture was heated for 1½ hours at 240° C. Next, MDI was added and heating was continued for 30 minutes at 230° C.

Of the polymers thus prepared samples were taken on which the properties mentioned in the table below were determined. The amount of MDI had been set to 9,3 parts per 100 parts of polyester-ester.

Table III

| Polymer weight ratio PBA/PBTP | C 63/37 | D 63/37 | E 63/37 | F 63/37 | G 63/37 |
|---|---|---|---|---|---|
| PBTP deactivated prior to transesterification with PEE (ppm) | 2700 | 1620 | 1080 | 540 | 0 |

Table III-continued

| Polymer weight ratio PBA/PBTP | C 63/37 | D 63/37 | E 63/37 | F 63/37 | G 63/37 |
|---|---|---|---|---|---|
| Ratio P/Ti | 10,0 | 6,0 | 4,0 | 2,0 | — |
| Tg (°C.) | −47/−35 | −46/−34 | −45/−34 | −33/−23 | −32/−2 |
| $Tm_p$ (°C.) | 222 | 207 | 212 | 160 | 80 |
| $S_{100}$ (MPa) | 8,8 | 8,3 | 7,3 | 7,3 | 3,5 |
| $S_{300}$ (MPa) | 15,7 | 16,0 | 14,3 | 12,8 | 6,3 |
| $S_{500}$ (MPa) | 25,3 | 25,0 | 26,0 | 23,7 | 13,0 |
| $S_{300/100}$ | 1,8 | 1,9 | 1,95 | 1,75 | 1,80 |
| $S_{500/100}$ | 2,9 | 3,0 | 3,55 | 3,2 | 3,7 |
| BS (MPa) | 31,7 | 45,8 | 39,2 | 39,2 | 25,3 |
| BR % | 600 | 700 | 680 | 700 | 700 |
| IS (MPa) | 222 | 366 | 306 | 314 | 202 |
| SR % | 31 | 32 | 32 | 30 | 35 |
| $V_{100\frac{1}{2}}\%$ | 55 | 58 | 42 | 24 | 40 |
| $V_{100\frac{1}{2}-\frac{1}{2}}\%$ | 30 | 38 | 18 | 17 | 27 |

The above table clearly shows that under the aforementioned reaction conditions a polymer having very good properties is obtained at a P/Ti ratio between 1 and 5. With the polymers E and F (P/Ti ratios of 4,0 and 2,0, respectively) the transesterification was optimal. With the polymer G the Ti catalyst was not deactivated and transesterification was very considerable, which resulted in a greatly decreased melting point, a decrease of the stress value at 100% elongation ($S_{100}$) and an increase in $V_{100-\frac{1}{2}}$.

EXAMPLE IV

In this example use was made of polycaprolactone (PCL) having a molecular weight of 2070 as low-melting polyester and a PBTP having a molecular weight of 16 000 prepared in the presence of 420 ppm of tetrabutyl titanate as catalyst. Three batches were prepared, each having a different weight ratio between the low-melting and the high-melting polyester.

In each case the NCO/OH ratio was 1,1. The reaction conditions were entirely identical with the ones given in Example III.

The properties measured on the elastomers obtained are given in the table below.

TABLE IV

| Polymer weight ratio PCL/PBTP | 63/37 | 50/50 | 37/63 |
|---|---|---|---|
| MDI (wt. %) | 8,4 | 7,2 | 5,1 |
| PEE (ppm) | 2500 | 2000 | 2250 |
| Tg (°C.) | −46/−32 | −43/−27 | −42/−24 |
| $Tm_p$ (°C.) | 180 | >150 | 208 |
| $S_{100}$ (MPa) | 6,0 | 11,7 | 17,0 |
| $S_{300}$ (MPa) | 10,0 | 13,3 | 20,7 |
| $S_{500}$ (MPa) | 17,7 | 18,2 | 27,3 |
| BS (MPa) | 34,2 | 24,7 | 32,7 |
| BR % | 730 | 730 | 700 |
| IS (MPa) | 284 | 205 | 262 |
| SR % | 31 | 31 | 34 |
| $V_{100\frac{1}{2}}\%$ | 21 | 30 | 45 |
| $V_{100\frac{1}{2}-\frac{1}{2}}\%$ | 15 | 18 | 35 |

The above table clearly demonstrates the influence of the composition on various physical properties. Thus, a higher percentage of hard segment (=PBTP) is attended with a higher melting point. An increase in the percentage by weight of PBTP also leads to higher stress value at 100, 300 and 500% elongation.

EXAMPLE V

Several polyester-ester urethanes were again prepared starting from polybutylene adipate having a molecular weight of 1840 and polybutylene terephthate having a molecular weight of 16 000 (prepared in the presence of 420 ppm of tetrabutyl titanate as catalyst).

For each batch the NCO/OH ratio was 1,1. Further, not only the weight ratio PBA/PBTP was varied; for two compositions it was demonstrated that in a further transesterification in the preparation of the polyester-ester there is obtained a polyester-ester urethane having a lower melting point, but several greatly improved physical properties for the respective compositions. The compositions of the elastomers prepared and the properties measured on them are summarized in the table below.

TABLE V

| weight ratio PBA/PBTP | 75/25 | | 63/37 | | 50/50 | 20/80 |
|---|---|---|---|---|---|---|
| % MDI | 10,7 | 10,7 | 9,2 | 9,2 | 7,8 | 4,2 |
| PEE (ppm) | 1250 | 1250 | 1000 | 1000 | 1250 | 1250 |
| Polymer | A | B | C | D | E | F |
| Tg (°C.) | −42/−23 | −47/−33 | −43/−25 | −33/−23 | −48/−32 | −18/−11 |
| $Tm_p$ | 210 | 162 | 208 | 160 | 203 | 215 |
| $S_{100}$ (MPa) | 7,7 | 4,6 | 7,2 | 7,3 | 12,7 | 28,3 |
| $S_{300}$ (MPa) | 12,2 | 10,7 | 15,3 | 12,8 | 18,0 | 30,8 |
| $S_{500}$ (MPa) | 19,3 | 24,8 | 24,3 | 23,7 | 28,7 | — |
| BS (MPa) | 30,7 | 38,0 | 40,8 | 39,2 | 51,7 | 45,0 |
| IS (MPa) | 224 | 277 | 314 | 314 | 410 | 216 |
| BR % | 630 | 630 | 670 | 700 | 700 | 380 |
| SR % | 39 | 33 | 33 | 30 | 31 | 22 |
| $V_{100\frac{1}{2}}\%$ | 57 | 53 | 55 | 24 | 34 | 66 |

TABLE V-continued

| weight ratio PBA/PBTP | 75/25 | | 63/37 | | 50/50 | 20/80 |
|---|---|---|---|---|---|---|
| % MDI | 10,7 | 10,7 | 9,2 | 9,2 | 7,8 | 4,2 |
| PEE (ppm) | 1250 | 1250 | 1000 | 1000 | 1250 | 1250 |
| Polymer | A | B | C | D | E | F |
| $V_{100\frac{1}{2}-\frac{1}{2}}$% | 40 | 22 | 33 | 17 | 23 | 68 |

Although the polymers B and D clearly have a lower melting point than the polymers A and C of the same composition, the former ones display distinctly better elastomeric properties, which is particularly manifest by the lower values for $V_{100-\frac{1}{2}-\frac{1}{2}}$.

EXAMPLE VI

The properties of polymer D of Example V are compared with those of a polyester-ester urethane of the same composition but prepared from a PBA having a relatively high molecular weight (14 000).

As in the preparation also use was made of a PBTP having a high molecular weight (16 000), the catalyst was not deactivated.

The measured properties were largely the same, except the Tg, which was significantly lower with the polymer derived from the high molecular weight PBA.

TABLE VI

| weight ratio PBA/PBTP | 63/37 | 63/37 |
|---|---|---|
| Polymer | A | B |
| prepared from PBA having a mol. wt. of | 1840 | 14000 |
| prepared from PBTP having a mol. wt. of | 16000 | 16000 |
| NCO/OH | 1,1 | 1,1 |
| MDI (wt. %) | 9,2 | 1,85 |
| PEE (ppm) | 1000 | 0 |
| Tg (°C.) | −33/−23 | −46/−36 |
| Tm$_p$ (°C.) | 160 | 150 |
| S$_{100}$ (MPa) | 7,3 | 6,3 |
| S$_{300}$ (MPa) | 12,8 | 10,0 |
| S$_{500}$ (MPa) | 23,7 | 14,7 |
| BS (MPa) | 39,2 | 36,7 |
| IS (MPa) | 314 | 341 |
| BR % | 700 | 830 |
| SR % | 30 | 30 |
| $V_{100\frac{1}{2}}$% | 24 | 30 |
| $V_{100\frac{1}{2}-\frac{1}{2}}$% | 17 | 20 |

EXAMPLE VII

A comparison is given of several polyester-ester urethanes of the same composition, but prepared by various processes according to the invention. Polymer A was prepared from a high molecular weight PBA and a low molecular weight PBTP.

For each composition the NCO/OH ratio was 1,1. The compositions of the starting products and the properties of the polyester-ester urethanes prepared therefrom are given in the table below. For each composition the weight ratio of PBA/PBTP was 63/37. In the preparation of polymer C the transesterification time was longer than in that of polymer B.

TABLE VII

| | Polymer | | |
|---|---|---|---|
| prepared from: weight ratio PBA/PBTP | A 63/37 | B 63/37 | C 63/37 |
| PBA (moleculair weight) | 14000 | 14000 | 14000 |
| PBTP (molecular weight) | 3000 | 16000 | 16000 |

TABLE VII-continued

| | Polymer | | |
|---|---|---|---|
| prepared from: weight ratio PBA/PBTP | A 63/37 | B 63/37 | C 63/37 |
| MDI (wt. %) | 4,5 | 1,85 | 1,85 |
| PEE (ppm) | 1100 | 0 | 0 |
| properties: | | | |
| Tg (°C.) | −47/−33 | −50/−40 | −46/−36 |
| Tm$_p$ (°C.) | 175 | 172 | 150 |
| S$_{100}$ (MPa) | 6,3 | 6,7 | 6,3 |
| S$_{300}$ (MPa) | 11,0 | 11,3 | 10,0 |
| S$_{500}$ (MPa) | 14,7 | 14,0 | 14,7 |
| BS (MPa) | 22,7 | 18,7 | 36,7 |
| IS (MPa) | 211 | 140 | 341 |
| BR % | 830 | 650 | 830 |
| SR % | 29 | 30 | 30 |
| $V_{100\frac{1}{2}}$% | 48 | 50 | 30 |
| $V_{100\frac{1}{2}-\frac{1}{2}}$% | 37 | 30 | 20 |

The above table clearly shows that the properties of the polyesterester urethanes according to the invention are very closely related to the degree of transesterification.

EXAMPLE VIII

For preparing a polyester-ester urethane the same procedure was used as described in Example VI (B), except that the PBTP employed had a molecular weight of 16 500. The weight ratio PBA/PBTP was 50/50. The amount of MDI was 1,8%.

On this polymer, in the preparation of which no deactivation took place, the properties mentioned in the table below were measured.

TABLE VIII

| | Polymer PBA/PBTP 50/50 |
|---|---|
| prepared from: | |
| PBA (mol. wt.) | 14000 |
| PBTP (mol. wt.) | 16500 |
| MDI (wt. %) | 1,8 |
| properties: | |
| Tg (°C.) | −43/−28 |
| Tm$_p$ (°C.) | 180 |
| S$_{100}$ (MPa) | 11,8 |
| S$_{300}$ (MPa) | 16,0 |
| S$_{500}$ (MPa) | 24,2 |
| BS (MPa) | 40,8 |
| IS (MPa) | 326 |
| BR % | 700 |
| $V_{100\frac{1}{2}}$% | 39 |
| $V_{100\frac{1}{2}-\frac{1}{2}}$% | 28 |
| SR % | 28 |

EXAMPLE IX

A polyester-ester urethane was prepared from PBA (molecular weight 1850) and PBTP (prepared in the presence of 420 ppm of tetrabutyl titanate; molecular weight 16 000), in a weight ratio PBA/PBTP of 37/63. The polyisocyanate used in this example was cyclohexyl diisocyanate (CHDI) [4% by weight].

The preparation was carried out in the same way as indicated in Example III, deactivation being carried out using 650 ppm of PEE.

The properties measured on the polymer are given in the table below.

TABLE IX

| prepared from: | Polymer PBA/PBTP 37/63 |
|---|---|
| PBA (mol. wt.) | 1850 |
| PBTP (mol. wt.) | 16000 |
| CHDI (wt. %) | 4 |
| PEE (ppm) | 650 |
| properties: | |
| Tg (°C.) | −55/−38 |
| $Tm_p$ (C.) | 217 |
| $S_{100}$ (MPa) | 18,1 |
| $S_{300}$ (MPa) | 19,3 |
| $S_{500}$ (MPa) | 23,4 |
| BS (MPa) | 33,0 |
| IS (MPa) | 231 |
| BR % | 600 |
| SR % | 34 |
| $V_{100\frac{1}{2}}$% | 52 |
| $V_{100\frac{1}{2}\text{-}\frac{1}{2}}$% | 42 |

EXAMPLE X

For preparing a polyester-ester urethane the same procedure was employed as in Example IX, except that use was made of 7,2% by weight of a trifunctional isoycanate. The trifunctional isocyanate used was the reaction product of MDI and the carbodiimide formed from MDI, which is marketed by Upjohn under the trade name Isonate 143 L. The properties measured on the polymer are given in the table below. They are compared with the properties of a polyester-ester urethane prepared in the same way, except that use was made of 6,4% by weight of MDI.

TABLE X

| | Polymer PBA/PBTP 37/63 | |
|---|---|---|
| prepared from: | | |
| PBA (mol. wt.) | 1850 | 1850 |
| PBTP (mol. wt.) | 16000 | 16000 |
| MDI (wt. %) | 6,4 | — |
| Isonate (wt. %) | — | 7,2 |
| PEE (ppm) | 650 | 650 |
| properties: | | |
| Tg (°C.) | −30/−8 | −25/−11 |
| $Tm_p$ (°C.) | 200 | 188 |
| $S_{100}$ (MPa) | 19,3 | 19,2 |
| $S_{300}$ (MPa) | 22,3 | 24,3 |
| $S_{500}$ (MPa) | 30,0 | 41,7 |
| BS (MPa) | 33,0 | 49,0 |
| IS (MPa) | 214 | 338 |
| BR % | 550 | 650 |
| SR % | 32 | 34 |
| $V_{100\frac{1}{2}}$% | 46 | 42 |
| $V_{100\frac{1}{2}\text{-}\frac{1}{2}}$% | 35 | 32 |

EXAMPLE XI

Polyester-ester urethane was prepared from PBA (molecular weight 1840) and PBTP (molecular weight 16000) or from PBTP in which 20% of the terephthalic acid had been replaced by isophthalic acid. The weight ratio of PBA to the high-melting polyester was 37/63. The polyisocyanate used was MDI (6,1% by weight).

The properties measured on the polyester-ester urethanes prepared are given in the table below.

TABLE XI

| prepared from | polymer with isophtalic acid | polymer without isophthalic acid |
|---|---|---|
| PBA (mol. wt.) | 1840 | 1840 |
| PBTP (mol. wt.) | — | 16000 |
| PBTP in which 20% of the terephthalic acid had been replaced by isophthalic acid (mol. wt.) | — | — |
| MDI (wt. %) | 6,1 | 6,1 |
| PEE (ppm) | 650 | 325 |
| $S_{100}$ (MPa) | 13,0 | 17,2 |
| $S_{300}$ (MPa) | 17,9 | 20,7 |
| $S_{500}$ (MPa) | 32,5 | 23,0 |
| BS (MPa) | 44,2 | 29,0 |
| IS (MPa) | 354 | 263 |
| BR % | 700 | 800 |
| SR % | 36 | 32 |
| $V_{100\frac{1}{2}}$% | 40 | 55 |
| $V_{100\frac{1}{2}\text{-}\frac{1}{2}}$% | 25 | 42 |
| Tg (°C.) | −27/0 | −22/−2 |
| $Tm_p$ (°C.) | 169 | 177 |

EXAMPLE XII

In this example it is demonstrated that the preparation of the polyester-ester urethanes according to the invention at a practically equal weight ratio of high-melting to low-melting polyesters and urethane groups may be realized by various routes.

All polyester-ester urethanes in this example were prepared from 37 parts of polybutylene adipate and 63 parts of polybutylene terephthalate.

The preparation of polymer A was started from 40 parts of PBTP (Mol. weight 16000; deactivated with 1500 ppm of PEE), 37 parts of PBA and 6,7% by weight of MDI. The resulting polyester-ester urethane was subsequently reacted with 23 parts of polybutylene terephthalate (mol. weight 23000).

The preparation of polymer B was carried out in the same way as indicated in Example III.

In the process used 63 parts of PBTP (molecular weight 16000; deactivated with 1200 ppm of PEE), 37 parts of PBA and 6,3% by weight of MDI were reacted with each other.

The preparation of polymer C was started from 40 parts of PBTP (molecular weight 16000) and 23 parts of PBTP (molecular weight 23000), which had both been deactivated with 1000 ppm of PEE, together with 37 parts of PBA and 6,15% by weight of MDI.

The properties measured on these polymers are given in the table below.

TABLE XII

| | Polymer | | |
|---|---|---|---|
| Properties | A | B | C |
| Tg (°C.) | −39/−16 | −36/−8 | −34/−11 |
| $Tm_p$ (°C.) | 207 | 206 | 208 |
| $S_{100}$ (MPa) | 20 | 20,5 | 22,5 |
| $S_{300}$ (MPa) | 30 | 25 | 29 |
| $S_{500}$ (MPa) | 48 | 37,5 | 43 |
| BS (MPa) | 55 | 37,5 | 43,3 |
| IS (MPa) | 358 | 225 | 260 |
| BR % | 550 | 500 | 500 |
| $SR_{100\frac{1}{2}}$% | 35 | 32 | 36 |
| $V_{100\frac{1}{2}}$% | 39 | 46 | 50 |
| $V_{100\frac{1}{2}\text{-}\frac{1}{2}}$% | 25 | 37 | 43 |
| Hardness (Shore D) | 57 | 55 | 63 |

EXAMPLES XIII THROUGH XVI

In the table below the properties are listed of a number of polyester-ester urethanes prepared in the same way as indicated in Example VI B. The table gives the molecular weights of the starting products, their weight ratios and the number of meq end groups per kg of polyester mixture.

TABLE XIII

| Example | mol. wt PBA | mol. wt PBTP | wt. ratio PBA/PBTP | Tg (°C.) | Tm$_p$ (°C.) | meq end groups per kg | BS (MPa) | BR % | IS (MPs) | V$_{100\frac{1}{2}}$ % | V$_{100\frac{1}{2}-\frac{1}{2}}$ % |
|---|---|---|---|---|---|---|---|---|---|---|---|
| XIII | 1850 | 16000 | 10/90 | −13/−42 | 210 | 220 | 43,3 | | 230 | 143 | 80 | 78 |
| XIV A | 1850 | 16000 | 27/73 | 0/+13 | 179 | 380 | 65 | | 500 | 390 | 56 | 43 |
| B | 7350 | 3000 | 27/73 | − 3/+18 | 194 | 560 | 42 | | 670 | 327 | 59 | 50 |
| C | 1850 | 3000 | 27/73 | + 2/+30 | 171 | 780 | 46 | | 525 | 288 | 74 | 42 |
| XV A | 7350 | 10600 | 50/50 | −29/−18 | 154 | 200 | 45 | | 650 | 338 | 39 | 33 |
| B | 1850 | 10600 | 50/50 | −26/−9 | 176 | 640 | 39 | | 530 | 247 | 51 | 43 |
| C | 1850 | 1500 | 50/50 | −18/+1 | 108 | 1207 | 25 | | 575 | 169 | 83 | 75 |
| XVI A | 7350 | 1500 | 63/37 | −41/−24 | 164 | 660 | 33 | | 530 | 210 | 21 | 15 |
| B | 1850 | 23000 | 63/37 | −33/−13 | 60 | 715 | 27 | | 670 | 208 | 49 | 27 |
| C | 1850 | 16000 | 63/37 | −32/−22 | 80 | 727 | 25 | | 700 | 202 | 40 | 27 |

The data given in the above table clearly show that when the number of meq end groups per kg of polyester mixture is higher than 700 meq per kg, the properties of the polymers no longer satisfy the specification according to the present application. Thus the Tg$_e$ of the polymer of Example XIV-C is 10° C. too high. Of the polymers XV-C and XVI-B and C the melting points are unacceptably low.

I claim:

1. Polyester-ester urethane built up of polyester-ester units which are linked together by low molecular weight structural units of the formula $$R_1[NHC\overset{O}{\parallel}]_{\overline{p}}$$

wherein $R_1$ represents a polyfunctional organic group having not more than 30 carbon atoms, and p is an integer of 2 or 3, which polyesterester units are built up of two types of polyester units containing (1) blocks comprising a multiple of ester units of the formula $$-OGOCR_2C\overset{O\phantom{O}O}{\underset{\phantom{O}}{\parallel\phantom{O}\parallel}}-$$

and (2) blocks comprising a multiple of other ester units which form a bifunctional polyester or polyester amide having a melting point not higher than 100° C., which two types of polyester units are linked together by ester bonds, with the proviso that: at least 80 mole % of the G groups in the latter formula are tetramethylene radicals and the remaining proportion thereof are divalent radicals left after removal of hydroxyl groups from a low molecular weight diol having a molecular weight not higher than 250; at least 80 mole % of the R$_2$ groups are 1,4-phenylene radicals and the remaining proportion thereof are divalent radicals left after removal of carboxyl groups from a low molecular weight dicarboxylic acid having a molecular weight not higher than 300; the sum of the percentages of G groups which are not tetramethylene radicals and of the percentage of R$_2$ groups which are not 1,4-phenylene radicals does not exceed 20; and the ester units of the formula $$-OGOCR_2C\overset{O\phantom{O}O}{\underset{\phantom{O}}{\parallel\phantom{O}\parallel}}-$$

form 20 to 90% by weight of the polyester-ester, characterized in that the interlinked ester units of the formula $$-OGOCR_2C\overset{O\phantom{O}O}{\underset{\phantom{O}}{\parallel\phantom{O}\parallel}}-$$

and the other ester units interlinked to form a bifunctional polyester or polyester amide are present in an amount such that the melting point of the polyester-ester urethane is at least 150° C. and when the blocks of the second type of ester units constitutes less than 50% by weight of the total number of ester units, the upper limit of the glass transition range thereof does not exceed +20° C. and when said blocks of the second type of ester units constitute more than 50% by weight of the total number of ester units, the upper limit of the glass transition range is not higher than −5° C.

2. Polyester-ester urethane according to claim 1, characterized in that the proportion of low-molecular weight structural units of the formula $$R_1[NHC\overset{O}{\parallel}]_{\overline{p}}$$

calculated as diphenylmethane-4,4'-diisocyanate (MDI) and based on the polyester-ester urethane is in the range of 0,5 to 25% by weight.

3. Polyester-ester urethane according to claim 2, characterized in that the proportion of low-molecular weight structural units of the formula $$R_1[NHC\overset{O}{\parallel}]_{\overline{p}}$$

is in the range of 1 to 15.

4. Polyester-ester urethane according to any one of claims 1 to 3, characterized in that the ester units of the formula $$-OGOCR_2C\overset{O\phantom{O}O}{\underset{\phantom{O}}{\parallel\phantom{O}\parallel}}-$$

are butylene terephthalate units.

5. Polyester-ester urethane according to any one of claims 1 to 3, characterized in that the ester units which may form a bifunctional polyester or polyester amide having a melting point not exceeding 100° C. are entirely or substantially derived from polybutylene adipate.

6. Polyester-ester urethane according to any one of claims 1 to 3, characterized in that the ester units which may form a bifunctional polyester or polyester amide having a melting point not exceeding 100° C. are entirely or substantially derived from polycaprolactone.

7. A process for the preparation of a polyester-ester urethane according to claim 1, in which process a bifunctional polyester having a molecular weight of at least 1000 and built up of ester units of the formula

wherein both G and $R_2$ have the same meaning as indicated in claim 1, is reacted, while in the molten phase, with a bifunctional polyester or polyester amide having a molecular weight of at least 1000 and a melting point not higher than 100° C., after which the resulting polyester-ester is reacted with a low molecular weight coupling agent of the formula $R_1[NCO]_p$ wherein $R_1$ and p have the meaning as indicated in claim 1, in an amount, such that the ratio of the number of —NCO groups to the number of functional groups of the polyester-ester is at least 1,0 and not higher than 5, characterized in that before and/or during the preparation of the polyester-ester the transesterification catalyst present in one or in both polyesters or polyester amides is entirely or partly deactivated.

8. A process for the preparation of a polyester-ester urethane according to claim 7, characterized in that it is started from a low-melting bifunctional polyester or polyester amide having a molecular weight of 1500 to 2500 and a high-melting polyester of the formula

having a molecular weight in the range of 10 000 to 25 000.

9. A process according to claim 8, characterized in that the high-melting polyester is polybutylene terephthalate having a molecular weight in the range of 15 000 to 19 000.

10. A process according to claim 7, characterized in that the deactivation is carried out by incorporating a complexing phosphorus compound into one polyester or both polyesters.

11. A process according to claim 10, characterized in that the amount of phosphorus compound used for the deactivation compounds to at least 0,5 phosphorus atoms per metal atom of the transesterification catalyst.

12. A process according to claim 10, characterized in that the amount of phosphorus compound used for the deactivation corresponds to at least 1 to 5 phosphorus atoms per metal atom of the transesterification catalyst.

13. A process according to any one of claims 10 to 12, characterized in that the phosphorus compound used is diethyl carbethoxymethyl phosphonate.

14. A process according to any one of claims 10 to 12, characterized in that the phosphorus compound used is tris(triethyleneglycol)phosphate.

15. A process according to claim 7, characterized in that the polyester-ester is prepared at a temperature between the melting point of the highest melting component and 290° C.

16. A process for the preparation of a polyester-ester urethane according to any one of claims 1 to 3, in which process a bifunctional polyester having a molecular weight of at least 1000 and built up of ester units of the formula

wherein both G and $R_2$ have the same meaning as indicated in claim 1, is reacted, while in the molten phase, with a bifunctional polyester or polyester amide having a molecular weight of at least 1000 and a melting point not higher than 100° C., after which the resulting polyester-ester is reacted with a low molecular weight coupling agent of the formula $R_1[NCO]_p$ wherein $R_1$ and p have the meaning given in claim 1, in an amount, such that the ratio of the number of —NCO groups to the number of functional groups of the polyester-ester is at least 1,0 and not higher than 5, characterized in that the number of end groups of the high-melting polyester and the low-melting polyester together do not amount to more than 700 meq per kg.

17. A process according to claim 16, characterized in that the number of end groups both of the high-melting polyester and of the low-melting polyester or polyester amide is in the range of 110 to 170 meq per kg in either case.

* * * * *